United States Patent [19]

Niessner et al.

[11] Patent Number: 5,399,620
[45] Date of Patent: Mar. 21, 1995

[54] BLOCK COPOLYMERS OF ACRYLATE AND METHACRYLATE UNITS

[75] Inventors: Norbert Niessner; Friedrich Seitz, both of Friedelsheim, Germany

[73] Assignee: BASF Aktiengesellschaft, Ludwigshafen, Germany

[21] Appl. No.: 121,463

[22] Filed: Sep. 16, 1993

Related U.S. Application Data

[62] Division of Ser. No. 983,121, Nov. 30, 1992, abandoned.

[30] Foreign Application Priority Data

Dec. 4, 1991 [DE] Germany ............... 41 39 962.5

[51] Int. Cl.⁶ .................. C08L 51/04; C08L 53/00
[52] U.S. Cl. ......................... 525/71; 525/73; 525/80; 525/93; 525/94; 525/302
[58] Field of Search ............... 525/71, 73, 80, 93, 525/94, 282, 302

[56] References Cited

U.S. PATENT DOCUMENTS

| | | | |
|---|---|---|---|
| 4,524,196 | 6/1985 | Farnham et al. | 526/126 |
| 4,794,144 | 12/1988 | Spinelli | 525/302 |
| 4,831,079 | 5/1989 | Ting | 525/71 |

FOREIGN PATENT DOCUMENTS

| | | |
|---|---|---|
| 243120 | 10/1987 | European Pat. Off. |
| 248596 | 12/1987 | European Pat. Off. |
| 323181 | 12/1987 | European Pat. Off. |
| 349270 | 6/1988 | European Pat. Off. |
| 329873 | 8/1989 | European Pat. Off. |

OTHER PUBLICATIONS

Gunesin et al., "Block Copolymers Obtained ... ", Sep. 1981, vol. 26, No. 9, 2296, *J. of Applied Poly. Science.*
Macromolecules, vol. 21, No. 9, Sep. 1988 pp. 2892-2894.
Macromolecular, vol 20 1987-pp. 1473-1488.
Macromolecules, vol. 17, 1984, pp. 1417-1419.
Journal of the American Chemical Society, vol. 105, 1983 pp. 5706-5708.
Polymer Preprints vol. 18, No. 1, Mar. 1977 686-693.
Polymer Preprints vol. 32, No. 1, Apr. 1991 299.

*Primary Examiner*—Tae H. Yoon
*Attorney, Agent, or Firm*—Keil & Weinkauf

[57] ABSTRACT

Linear, star or dendrimeric block copolymers are composed of from 10 to 90% by weight of at least one block of one or more acrylates of an alcohol of 1 to 8 carbon atoms and from 10 to 90% by weight of at least one block of one or more methacrylates of an alcohol of 1 to 8 carbon atoms, each block having a number average molecular weight of from 1,000 to 100,000 g/mol and the quotient $M_w/M_n$ (weight average/number average) of each block being less than 2, and said block copolymers may be blended with styrene copolymers or acrylate copolymers and, if required, acrylate rubbers.

2 Claims, No Drawings

BLOCK COPOLYMERS OF ACRYLATE AND METHACRYLATE UNITS

This application is a division of application Ser. No. 07/983,121, filed on Dec. 2, 1992, now abandoned.

While block copolymers, for example styrene and butadiene, having an ideal block structure are readily obtained by anionic polymerization and have become important industrially (particularly in the form of star block copolymers), such macromolecules of acrylates and methacrylates are unknown to date.

Only quasi-block copolymers of butyl acrylate on the one hand and methyl methacrylate on the other hand have been obtained by the free radical method by Piirma and Gunesin (Polym. Prepr. 18 (1977), 687).

Group transfer polymerization (GTP) is in principle a method for preparing block copolymers, including those of acrylates or methacrylates.

However, only block copolymers of various acrylates on the one hand and methacrylates on the other hand, i.e. in each case within these groups, have been prepared to date (Yu, Choi, Lim, Choi in Macromolecules 21 (1988), 2893, and Sogah et al. Macromolecules 20 (1987), 1473).

The different reactivities of acrylates and methacrylates make it possible to prepare such block copolymers. However, Hertler et al. in Macromolecules 17 (1984), 1417 state that it is not possible, using one and the same catalyst, to prepare block copolymers of methyl methacrylate and n-butyl acrylate having a molecular nonuniformity $M_w/M_n$ of less than 2.

A star block copolymer of methyl methacrylate and tert-butyl acrylate is described by Ph. Teyssie et al. (Polym. Preprints 1 (1991), 299).

We have found that linear, star and dendrimeric block copolymers (A) of at least one alkyl acrylate and at least one alkyl methacrylate (with linear $C_1$–$C_8$-alcohols in each case) have advantageous properties for many intended uses; they can be obtained by the GTP method. Group transfer polymerization is described, for example, by O. W. Webster, W. R. Hertler, D. Y. Sogah, W. B. Farnham, T. V. Rajan Babu, J. Am. Chem. Soc. 105 (1983), 5706.

Here, a methacrylate (e.g. methyl methacrylate) is polymerized with, for example, dimethyl ketene methyl trimethylsilyl acetal as an initiator in the presence of catalysts, for example bifluorides. The trimethylsilyl group of the growing chain end is transferred to each newly added monomer unit. Narrow molecular weight units are obtained.

An important application for the novel block copolymers is the production of transparent blends with polymers of styrene or (meth)acrylates and copolymers thereof, for example with one another and with acrylonitrile or methacrylonitrile or maleimide monomers.

The present invention therefore directly relates to a linear, star or dendrimeric block copolymer A, composed of A1: from 10 to 90% by weight of at least one block of one or more acrylates of an alcohol of 1 to 8 carbon atoms and A2: from 10 to 90% by weight of at least one block of one or more methacrylates of an alcohol of 1 to 8 carbon atoms, each block having a number average molecular weight $M_n$ of from 1,000 to 100,000 g/mol and the quotient $M_w/M_n$ (weight average/number average) of each block being less than 2.

The present invention furthermore relates to molding materials, i.e. blends of the abovementioned block copolymers A with further copolymers B and possibly a third component C, i.e. molding materials containing, based on the sum of A, B and, if required, C:

A: from 1 to 99% by weight of a block copolymer A,
B: from 1 to 99% by weight of a copolymer B composed of from 50 to 95% by weight of styrene or of a substituted styrene or of a $C_1$–$C_8$-alkyl (meth)acrylate and at least one further monomer selected from the group consisting of acrylonitrile, methacrylonitrile, N-alkyl- or N-aryl-substituted maleimide, maleic anhydride, acrylic acid and acrylamide, and, if required,
C: up to 98% by weight of a copolymer or graft copolymer C of, based on the sum of C1 and C2,
  C1: from 50 to 100% by weight of an acrylate rubber C1 and
  C2: up to 50% by weight of one or more shells which may be grafted onto C1 and consist of
    C21: from 35 to 75% by weight of at least one styrene or substituted styrene or (meth)-acrylate and
    C22: from 25 to 65% by weight of acrylonitrile, methacrylonitrile, N-alkyl- or N-aryl-substituted maleimide, maleic anhydride, acrylic acid or acrylamide.

Regarding the novel block copolymers A and their components in the blend, the following can be stated specifically:

Copolymer A

The novel molding materials may contain, as copolymer A, from 1 to 99, preferably from 20 to 90, % by weight of at least one block copolymer which is composed of from 10 to 90, preferably from 20 to 80, % by weight of at least one acrylate block and from 10 to 90, preferably from 20 to 80, % by weight of at least one further block of methacrylate units, each block having a number average molecular weight $M_n$ of from 1,000 to 100,000, preferably from 2,000 to 80,000 and the quotient $M_w/M_n$ (weight average/number average) of each block being less than 2.

The block copolymers may be linear, for example according to the pattern A1-A2, A1-A2-A1, A1-A2-A1, (A1-A2)$_n$, star-shaped, eg. A1(A2)$_n$, A1(A2)$_n$, (A1)$_n$-A2-A1-(A2)$_m$ (recurrent depth 1), dendrimeric, eg. ((A1)$_n$-A2)$_m$A1, ((A2)$_n$-A1)$_m$A2 (recurrent depth 2) or ((A1)$_m$-A2)$_n$A1)$_p$A2, ((A2)$_m$-A1)$_n$A2)$_p$A1 (recurrent depth 3), or comb-like, eg.
(A1$_n$-A1(A2))$_q$, (A2$_n$-A2(B1))$_q$
where A1 is an acrylate block, A2 is a methacrylate block, m, n and p are each an integer of from 1 to 3 and q is an integer from 0 to 1,000 and, in the case of the dendrimeric block copolymers, the recurrent depth may be up to 10.

Suitable acrylates for the formation of the acrylate block are $C_1$–$C_8$-alkyl acrylates, for example methyl acrylate, ethyl acrylate, n-butyl acrylate and 2-ethylhexyl acrylate. n-Butyl acrylate and 2-ethylhexyl acrylate are preferred. Acrylates having aromatic radicals, for example 2-phenoxyethyl acrylate, phenylmethyl acrylate, phenylethyl acrylate, phenylbutyl acrylate and benzyl acrylate, are also suitable.

Suitable methacrylates for the formation of the methacrylate block are all aliphatic $C_1$–$C_8$-methacrylates, such as methyl methacrylate, ethyl methacrylate or butyl methacrylate, in particular methyl methacrylate, as well as methacrylates having aromatic units, such as phenyl methacrylate.

The novel block copolymers A are prepared by the method of group transfer polymerization (GTP).

As in the case of anionic polymerization, GTP permits the controlled preparation of polymers, in particular of the acrylates or methacrylates, having defined molecular weights and a very narrow molecular weight distribution. Owing to the substantially different reactivities, however, it has not been possible to date to prepare defined polyacrylates and polymethacrylates having a narrow molecular weight distribution using the same system of catalyst and initiator.

The reaction, i.e. polymerization, can in general be carried out at room temperature, in contrast to ionic polymerization, in which considerable cooling is necessary. The initiators and catalysts in GTP are, however, very water-sensitive, so that apparatuses and starting materials must be dried thoroughly.

The molar ratio of monomer to initiator determines the molecular weight. On the other hand, the catalyst is generally required only in amounts of less than 0.1% by weight, based on the initiator.

The monomer most frequently used in the literature, methyl methacrylate, can be readily polymerized by GTP with a molecular weight nonuniformity $M_w/M_n$ of from 1.1 to 1.4 for a molecular weight up to about 100,000.

Preferably used initiators are silyl ketene acetals of the structure

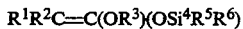

where $R^1$ to $R^6$ independently of one another are each $C_1$–$C_4$-alkyl or $C_6$–$C_{10}$-aryl. O-(Trimethylsilyl )-O'-methyl-2,2-dimethyl ketene (1)-acetal ($R^1$ to $R^6$=CH$_3$; MDTA) is particularly preferred.

Trialkylsilyl ketene acetals can he conveniently prepared by reacting ester enolates with trialkylsilyl chlorides (C. Ainsworth, F. Chen, Y.-N. Kuo, J. Organomet. Chem. 46 (1972), 59).

Other initiators known to the skilled worker can also he used, for example silyl cyanides, in particular trimethylsilyl cyanide.

A catalyst which, being a nucleophile, is capable of forming a coordinate bond with the silicon atom in order to accelerate the reaction is also required for the GTP. The most frequently used catalyst is the bifluoride ion. Further catalysts are artions, eg. fluoride, difluorotrimethylsiliconate or cyanide. Although Lewis acid compounds are also capable of catalyzing the GTP process, anions are preferably used. Examples of further catalysts are carboxylates, phenolates, sulfinates, phosphinates, sulfonamidates and perfluoroalkoxide ions and the corresponding bioxy anions (1:1 complexes of oxy anions with their conjugated acids). These and further conventional catalysts for GTP are described, inter alia, in: O. W. Webster et al., J. Macromol. Sci., Chem. Ed. A 21 (8, 9) (1984), 943–960; I. B. Dicker et al., Macromolecules 23 (1990), 4034–4041; W. R. Hertler et al., Macromolecules 17 (1984), 1415 et seq.; U.S. Pat. No. 4,621,125.

Catalysts having the bifluoride anions, $HF_2^-$, are preferably used.

The group transfer polymerization of, for example, methyl methacrylate (MMA) with MDTA is thought to take place as follows:

In the initiation step, the trimethylsilyl group of MDTA undergoes addition at the oxygen atom of the MMA; the remainder of the MDTA molecule group is bound to the MMA in the $\beta$-position. This step is then repeated for each new MMA monomer, resulting in a living chain end which always carries the silyl group. Details are described by, inter alia, T. H. Maugh in Science 222 (1983), 39.

Copolymer B

The novel thermoplastic molding materials may contain, as copolymer B, from 1 to 99, preferably from 10 to 80, % by weight of a thermoplastic copolymer (rigid matrix) of B$_1$) from 50 to 95, preferably from 60 to 80, % by weight of styrene or of a substituted styrene or a $C_1$–$C_8$-alkyl (meth)acrylate or a mixture thereof and B$_2$) from 5 to 50, preferably from 20 to 40, % by weight of acrylonitrile, methacrylonitrile, a $C_1$–$C_8$-alkyl (meth)acrylate, maleic anhydride, maleimide which is N-substituted by $C_1$–$C_8$-alkyl or by $C_6$–$C_{20}$-aryl, acrylic acid, acrylamide or a mixture thereof.

The copolymers B are resin-like, thermoplastic and rubber-free. Particularly preferred copolymers B are those of styrene with acrylonitrile and, if required, with methyl methacrylate, of $\alpha$-methylstyrene with acrylonitrile and, if required, methyl methacrylate or of styrene and $\alpha$-methylstyrene with acrylonitrile and, if required, with methyl methacrylate and of styrene and maleic anhydride. A plurality of the copolymers described may also be used simultaneously.

The copolymers B are known per se and can be prepared by free radical polymerization, in particular by emulsion, suspension, solution or mass polymerization. They have a viscosity number of from 40 to 160; this corresponds to a weight average molecular weight $\overline{M}_w$ of from 40,000 to 2,000,000.

These rigid components B include the free, ie. ungrafted, copolymers of vinylaromatic monomers and polar monomers, which copolymers are formed in the preparation of the graft copolymer C described below.

Copolymer C

A crosslinked, rubber-like acrylate polymer and/or a graft copolymer is used as the copolymer C. In a preferred embodiment, only the polymers described below as grafting base C1 are used as copolymer C.

Copolymer C is prepared, for example, as a result of the graft copolymerization of a mixture of vinylaromatic monomers and polar, copolymerizable ethylenically unsaturated monomers under a crosslinked, rubber-like acrylate polymer. Since, as a rule, 100% grafting does not take place in the graft copolymerization, the polymerization product of the graft copolymerization always contains free, ungrafted copolymer (cf. information above). For the purpose of the present invention, however, only the actually grafted rubber is referred to as the graft copolymer. The proportion of graft copolymer in the polymerization product of the graft copolymerization can be determined in a known manner by extraction of the free, ungrafted polymer from the polymerization product, for example by means of methyl ethyl ketone, since the grafting base of the graft copolymer is crosslinked and the graft copolymer is thus insoluble. The principle of the separation method has been described, for example by Moore, Moyer and Frazer, Appl. Polymer Symposia, page 67 et seq. (1968).

For the purposes of the present invention, the degree of grafting is the percentage, based on the total graft copolymer, of styrene and acrylonitrile chemically bonded in the grafts of the graft copolymer. The degree of grafting can readily be calculated from the analytically determinable composition of the gel which is insoluble in methyl ethyl ketone.

The median particle sizes according to the invention are in all cases the weight average of the particle sizes, as determined by means of an analytical ultracentrifuge according to the method of W. Scholtan and H. Lange, Kolloid-Z. and Z. Polymere 250 (1972), 782–796. The ultracentrifuge measurement gives the integral mass distribution of the particle diameter of a sample.

From this it is possible to determine the percentage by weight of the particles which has a diameter equal to or smaller than a certain size. The median particle diameter, which is also referred to as the $d_{50}$ value of the integral mass distribution, is defined as the particle diameter at which 50% by weight of particles have a diameter smaller than the diameter corresponding to the $d_{50}$ value. Likewise, 50% by weight of the particles then have a diameter larger than the $d_{50}$ value. To characterize the width of the particle size distribution of the rubber particles, the $d_{10}$ and $d_{90}$ values determined from the integral mass distribution are used in addition to the $d_{50}$ value (median particle diameter). The $d_{10}$ or $d_{90}$ value of the integral mass distribution is defined similarly to the $d_{50}$ value, except that they are based on 10 and 90% by weight, respectively, of the particles. The quotient Q $$\frac{d_{90} - d_{10}}{d_{50}} Q$$

is a measure of the width of the particle size distribution.

The novel graft copolymers C are obtained in a known manner. Elastomeric crosslinked acrylate polymers of an appropriate type which have a glass transition temperature of less than 0° C. are used as grafting base C1. The crosslinked acrylate polymers should preferably have glass transition temperatures of less than −20° C., in particular less than −30° C. The glass transition temperature of the acrylate polymers can be determined, for example, by the DSC method (K. H. Illers, Makromol. Chemie 127 (1969), 1). Suitable monomers are alkyl acrylates where the alkyl radical is from 2 to 8, preferably 4 to 8, carbon atoms. n-Butyl acrylate and ethylhexyl acrylate are particularly suitable. The monomers can each be used alone or as a mixture with one another. Where the grafting base C1 is the sole component C, the novel block copolymers A impart compatibility between C1 and the thermoplastic polymers B. In order to obtain crosslinked acrylate polymers, the polymerization is carried out in the presence of from 0.5 to 10, preferably from 1 to 5, % by weight, based on the total amount of monomers used in the preparation of the grafting base, of a copolymerizable, polyfunctional monomer which effects crosslinking. Suitable polyfunctional crosslinking monomers of this type are monomers which preferably contain two or more ethylenic double bonds which are capable of copolymerization and are not conjugated in the 1,3-position. Examples of suitable monomers are divinyl-benzene, diallyl maleate, diallyl fumarate and diallyl phthalate. The acrylate of tricyclodecenyl alcohol has proven particularly suitable (cf. German Patent 1,260,935, which also provides information for the preparation described below).

First, the grafting base C1 is prepared by polymerizing the acrylate or acrylates and the crosslinking monomers, if necessary together with further comonomers, in aqueous emulsion in a conventional manner. The conventional emulsifiers are used, in amounts of from 0.5 to 5% by weight, based on the monomers. The sodium salts of alkylsulfonates or fatty acids of 10 to 18 carbon atoms are preferably used. In general, a water to monomer ratio of from 2:1 to 0.7:1 is used. The conventional persulfates, e.g. potassium persulfate, are used as polymerization initiators, but redox systems may also be employed. The conventional buffer substances and, if necessary, molecular weight regulators, such as mercaptans, terpinols or dimeric α-methylstyrene, may be used as further polymerization assistants.

The exact polymerization conditions, in particular the type, metering and amount of the emulsifier, are chosen so that the resulting latex has a $d_{50}$ value of from about 50 to 1,500 nm, preferably from 80 to 1,000 nm. The particle size distribution of the latex should preferably be narrow. The quotient $Q=(d_{90}-d_{10})/d_{50}$ should be less than 0.5, if possible less than 0.35. This is achieved, for example, by ensuring the constant concentration of monomers and emulsifier during the polymerization and by maintaining a constant temperature.

For the preparation of the graft copolymer C, the vinylaromatic compound, ie. styrene, α-methylstyrene or styrene alkylated in the nucleus, or the alkyl (meth)acrylate and the copolymerizable, ethylenically unsaturated monomer or monomers, ie. (meth)acrylonitrile, alkyl (meth)acrylate where the alkyl radical is of 1 to 8 carbon atoms, acrylic acid, maleic anhydride, acrylamide or maleimide which is N-substituted by $C_1-C_8$-alkyl or by $C_6-C_{20}$-aryl, are then copolymerized, advantageously once again in aqueous emulsion, onto the grafting base present as the latex (ie. emulsion). The graft copolymerization can be carried out in the same system as the emulsion polymerization for the preparation of the grafting base, and, if necessary, further emulsifier and initiator may be added. The monomer mixture to be grafted on can be added to the reaction mixture all at once, batchwise in a plurality of stages or preferably continuously during the polymerization. The graft copolymerization is carried out so that a degree of grafting of from 25 to 65, preferably from 30 to 40, % by weight results in the graft copolymer C. Since the grafting yield in the graft copolymerization is not 100%, the amount of monomer mixture used in the graft copolymerization must be slightly larger than that corresponding to the desired degree of grafting. The grafting yield in the graft copolymerization and hence the degree of grafting of the finished graft copolymer C can be controlled, for example, by the rate of metering of the monomers or by the addition of the regulator (Chauvel, Daniel, ACS Polymer Preprints 15 (1974), 329 et seq.). The amount of graft copolymer C in the resulting polymerization product is determined as described.

The graft copolymerization can advantageously be carried out in the same system as the emulsion polymerization for the preparation of the grafting base C; further emulsifier and initiator may be added. The monomer to be grafted on, i.e. in particular styrene, can be added to the reaction mixture all at once, batchwise in a plurality of stages or preferably continuously during the polymerization. Examples of monomers for the graft copolymerization (component $C_2$) have already been stated in the description of component B.

The molecular weights stated below were determined by gel permeation chromatography (GPC) on crosslinked polystyrene gels using tetrahydrofuran as eluent, 25,000 theoretical plates and a one-line UV photometer (254 nm wavelength) as the detector. The calibration was effected using monodisperse polystyrene samples. The method is described, for example, in G. Glöckner, Polymercharakterisierung dutch Flüssigkeits-Chromatographie, Hüthig-Verlag 1980, page 128 et seq.

EXAMPLE

Copolymer A

The block copolymer A-1 used was a poly(n-butyl acrylate-block-methyl methacrylate) which was prepared as follows:

60 ml of tetrahydrofuran, 2.13 mmol of 1-methoxy-1-trimethylsilyloxy-2-methyl-1-propene and 5 micromol of tris-(dimethylamino)-sulfuryl difluoride (TASHF$_2$) were initially taken in the absence of air and moisture, 18 g of methyl methacrylate were added dropwise in the course of 30 minutes at 20° C. and the mixture was then cooled to 0° C. A sample (500 μl) was taken, precipitated in methanol and dried. The sample was investigated by gel chromatography (sample A). A mixture of 18 g of n-butyl acrylate and 5 micromol of TASHF$_2$ was added dropwise in the course of 30 minutes. A sample (500 μl) was again taken, precipitated in methanol and dried. The sample was investigated by gel chromatography (sample B). The reaction was terminated with 1 ml of methanol.

Yield: 97%.

Gel chromatographic molecular weight (determined by GPC):

|  |  | Methacrylate block Sample A | Total polymer Sample B | Acrylate block*) Sample B − Sample A |
|---|---|---|---|---|
|  | $M_n =$ | 14,800 | 23,000 | 8,200 |
|  | $M_w =$ | 18,600 | 34,000 | 15,400 |
| Non-uniformity | $M_w/M_n =$ | 1.3 | 1.5 | 1.9 |
| Molecular weight of sample B (calculated): |  |  |  |  |
|  | $M_n =$ | 17.000 |  |  |

Glass transitions (determined by DSC): −42° C., 107° C.
*)Calculated by subtraction (sample B − sample A)

Copolymer B

A copolymer of styrene and acrylonitrile in a weight ratio of 80:20, having a viscosity number of 83 ml/g (measured in a 0.5% strength by weight solution in dimethylformamide at 23° C.) and prepared by continuous solution polymerization by a method as described in, for example, Kunststoff-Handbuch, Vieweg-Daumiller, Volume V (Polystyrol), Carl-Hanser-Verlag, Munich 1969, page 124.

Components A and B were mixed in dry form in a fluid mixer and the mixture was extruded at 260° C. in a twin-screw extruder (ZSK 30 from Werner & Pfleiderer).

We claim:

1. A molding material containing, based on the sum of A, B, and C:

A: from 1 to 99% by weight of a linear, star or dendrimeric block copolymer A, composed of A1: from 10 to 90% by weight of at least one block of one or more acrylates of an alcohol of 1 to 8 carbon atoms and A2: from 10 to 90% by weight of at least one block of one or more methacrylates of an alcohol of 1 to 8 carbon atoms, each block having a number average molecular weight of $M_n$ of from 1,000 to 100,000 g/mol and the quotient $M_w/M_n$ (weight average/number average) of each block being less than 2, B: from 1 to 99% by weight of a copolymer B composed of from 50 to 95% by weight of styrene or a substituted styrene or of a $C_1$-$C_8$-alkyl (meth)acrylate and at least one further monomer selected from the group consisting of acrylonitrile, methacrylonitrile, N-alkyl- or N-aryl-substituted maleimide, maleic anhydride, acrylic acid and acrylamide, and, C: is present in an amount up to 98% by weight of a homopolymer or graft copolymer C of, based on the sum of C1 and C2, C1: from 50 to 100% by weight of an acrylate rubber C1 and C2: up to 50% by weight of one or more shells which may be grafted onto C1 and consist of C21: from 35 to 75% by weight of at least one styrene or substituted styrene or (meth)-acrylate and C22: from 25 to 65% by weight of acrylonitrile, methacrylonitrile, N-alkyl- or N-aryl-substituted maleimide, maleic anhydride, acrylic acid or acrylamide.

2. A molding material as defined in claim 1, wherein C1 is butyl acrylate or hexylethyl acrylate.

* * * * *